US011292577B2

(12) United States Patent
Iagulli et al.

(10) Patent No.: US 11,292,577 B2
(45) Date of Patent: Apr. 5, 2022

(54) METHOD FOR MANUFACTURING A MULTI-RIBBED WING BOX OF COMPOSITE MATERIAL WITH INTEGRATED STIFFENED PANELS

(71) Applicant: LEONARDO S.p.A., Rome (IT)

(72) Inventors: Gianni Iagulli, San Severo (IT); Marco Raffone, Naples (IT); Alberto Russolillo, Foggia (IT); Tommaso Nanula, Barletta (IT); Giuseppe Totaro, Lucera (IT)

(73) Assignee: LEONARDO S.P.A., Rome (IT)

( * ) Notice: Subject to any disclaimer, the term of this patent is extended or adjusted under 35 U.S.C. 154(b) by 394 days.

(21) Appl. No.: 16/680,622

(22) Filed: Nov. 12, 2019

(65) Prior Publication Data
US 2020/0148328 A1    May 14, 2020

(30) Foreign Application Priority Data

Nov. 14, 2018  (IT) .......................... 102018000010328

(51) Int. Cl.
*B64C 3/00* (2006.01)
*B64F 5/00* (2017.01)
(Continued)

(52) U.S. Cl.
CPC ............ *B64C 3/26* (2013.01); *B29C 33/0033* (2013.01); *B29C 33/485* (2013.01);
(Continued)

(58) Field of Classification Search
CPC .... B64C 3/00; B64C 3/10; B64C 3/18; B64C 3/187; B64C 3/20; B64C 3/26; B64F 5/00;
(Continued)

(56) References Cited

U.S. PATENT DOCUMENTS

| 1,394,558 A | * | 10/1921 | Klug .................... | B29D 99/006 |
| | | | | 264/248 |
| 2018/0063895 A1 | * | 3/2018 | Van Tooren .............. | H01F 1/00 |

FOREIGN PATENT DOCUMENTS

| EP | 3037343 A1 | 6/2016 |
| EP | 3150484 A1 | 4/2017 |
| WO | 2017071852 A2 | 5/2017 |

OTHER PUBLICATIONS

Italian Search Report IT 201800010328 dated Jul. 2, 2019.

* cited by examiner

*Primary Examiner* — Jacob T Minskey
*Assistant Examiner* — Matthew Hoover
(74) *Attorney, Agent, or Firm* — Arent Fox LLP; Michael Fainberg

(57) ABSTRACT

A method for manufacturing a wing box for aircraft comprises the steps of arranging, on a curing surface, a first panel of composite material, alternately arranging, on the first panel, along a transverse direction, a rib of non-polymerized composite material and a tool comprising a central part, a bottom part and a top part, wherein the central part of each tool is interposed between said bottom part and the top part and may be extracted in a transverse direction, arranging a second panel of composite material by putting said second panel in contact with the flanges of each rib, pulling out the central part of each tool along the transverse direction and removing the top part and the bottom part of each tool, and subjecting the first panel, the second panel, and each rib to a curing process in autoclave with vacuum bag.

16 Claims, 7 Drawing Sheets

(51) Int. Cl.
*B29C 33/00* (2006.01)
*B29D 99/00* (2010.01)
*B64C 3/26* (2006.01)
*B64C 3/18* (2006.01)
*B64C 3/20* (2006.01)
*B64F 5/10* (2017.01)
*B29C 33/48* (2006.01)
*B29L 31/30* (2006.01)

(52) U.S. Cl.
CPC .......... *B29D 99/0014* (2013.01); *B64C 3/187* (2013.01); *B64C 3/20* (2013.01); *B64F 5/10* (2017.01); *B29L 2031/3085* (2013.01)

(58) Field of Classification Search
CPC ......... B64F 5/10; B29C 33/00; B29C 33/003; B29C 33/0033; B29C 33/40; B29C 33/48; B29C 33/485; B29D 99/00; B29D 99/001; B29D 99/0014
See application file for complete search history.

METHOD FOR MANUFACTURING A MULTI-RIBBED WING BOX OF COMPOSITE MATERIAL WITH INTEGRATED STIFFENED PANELS

CROSS-REFERENCE TO RELATED APPLICATION

This application claims priority to Italian Patent Application No. 102018000010328 filed Nov. 14, 2018, the entire contents of which is hereby incorporated in its entirety by reference.

FIELD OF THE INVENTION

The present invention relates to a method for manufacturing a structural component for aircraft. In particular, the invention relates to a method for manufacturing a multi-ribbed wing box made of composite material with integrated stiffened panels, usable in particular as a structural box in a wing, or in a vertical or horizontal empennage.

BACKGROUND OF THE INVENTION

The configuration currently adopted for aeronautical boxes—for wings or empennages of fixed-wing aircraft—consists of a set of different primary structural components, such as, typically, two stiffened panels with longitudinal stringers, two longitudinal spars, a certain number of transverse ribs, angular elements and conventional mechanical fastening elements.

These components, made of composite material and/or metal, are manufactured individually and, subsequently, are assembled in the final configuration of the wing box through drilling operations and installation of mechanical fastening members (rivets, bolts and the like). This conventional configuration is called 'build-up' configuration, and is characterized by significant disadvantages in terms of production costs, including: a large number of parts to be manufactured and managed in the production system, a very onerous assembly process due to the large number of holes to be made and fastening members to be installed, as well as the inspections necessary to verify the absence of openings or space between the coupled parts, and the additional activities required during construction to apply any fillers needed to fill the aforesaid gaps, when present. In addition, the so-called build-up configuration also entails significant drawbacks in the weight of the structure, which are badly tolerated in aeronautical applications, especially due to the increase in the operating cost of the aircraft, i.e. in fuel consumption. The weight increase for these assemblies is essentially due to the unavoidable presence of holes in the coupling areas between the various elements. Indeed, the holes, being a localized weakening of the component, require a thickening of the areas concerned, in order to safely withstand the design load. In addition, for composite structures, the weight of the fastening members also has a negative effect, since it is greater than the weight of the portion of material removed.

In the known art for manufacturing tail empennages there is also a technique that allows the creation of integrated multi-spar wing boxes in co-cured composite. This technology, while overcoming all the technical problems typical of the build-up configuration mentioned above, is characterized by significant geometric and configuration limitations that limit its applicability to solely horizontal stabilizers of commercial aircraft. Specifically, multi-spar co-cured wing boxes are not sufficiently competitive, in terms of weight and cost, with respect to wing boxes in build-up configuration for structures for which a high resistance to torsion is required, such as wing boxes and tail unit boxes. A further technical problem of this technology is that it is not applicable to configurations that provide for the presence, in addition to the spars, of additional reinforcement stringers, for the longitudinal stiffening of the structure. Furthermore, according to the prior art, it is not possible to make wing boxes with highly curved aerodynamic profiles and/or with inner thickening or stiffening elements in the transverse direction (i.e., that extend in the direction of the length of the wing profile), or with the stringers interrupted in the longitudinal direction (i.e., perpendicular to the direction of the length of the wing profile) of the wing box. These limitations, which severely compromise the possibility of making the aircraft wing box more efficient from a structural point of view and therefore in terms of weight, are essentially due to the fact that the multi-spar may only be co-cured in configurations wherein it is possible to extract the auxiliary tools, i.e. the tools used for the construction of each cell or bay of the structure.

SUMMARY OF THE INVENTION

The object of the present invention is to implement a process for manufacturing an aircraft wing box that overcomes the drawbacks and limitations of applicability of the prior art.

This and other objects are achieved according to the present invention through a method for manufacturing a wing box for aircraft as described and claimed herein.

Advantageous embodiments of the invention are also described.

In short, the invention is based on the idea of providing a method for manufacturing a wing box for aircraft wherein the wing box comprises a first and a second panel, stiffened with a plurality of longitudinal reinforcement stringers, and a plurality of ribs, arranged transversely, which are subjected to a single curing process. This is made possible by the use, before the curing process, of a plurality of tools, i.e., auxiliary tools, to ensure precise relative positioning of the components, each of said tools comprising a central removable part, which allows the removal of the tools even when the main body is fully assembled.

At the end of the method according to the invention, a pair of spars may be mechanically assembled to the wing box, in a known-per-se manner, with external closure on the long sides of the wing box.

According to one embodiment of the invention, at least one among the first and the second panel is supplied already polymerized, and the plurality of ribs is assembled to it by means of a co-bonding process, i.e. a ply of adhesive material is placed between the panel and the ribs before polymerization.

Advantageously, each tool is covered, before the curing process, with one or more curing bags, in a manner known per se.

Preferably, the central part of each tool has a tapered section along the transverse direction.

By virtue of such a configuration of the tools, it is possible to simply pull the tools out of the assembly before the curing process, whereby a method according to the invention allows the creation of multi-ribbed wing boxes that have a more complex configuration and may also be used for structures that require greater torsional strength compared to the use of a horizontal stabilizer as a wing box.

Further features and advantages of the present invention will become more apparent from the detailed following description, provided purely by way of non-limiting examples with reference to the drawings.

DETAILED DESCRIPTION OF PREFERRED EMBODIMENTS

Figure 1:
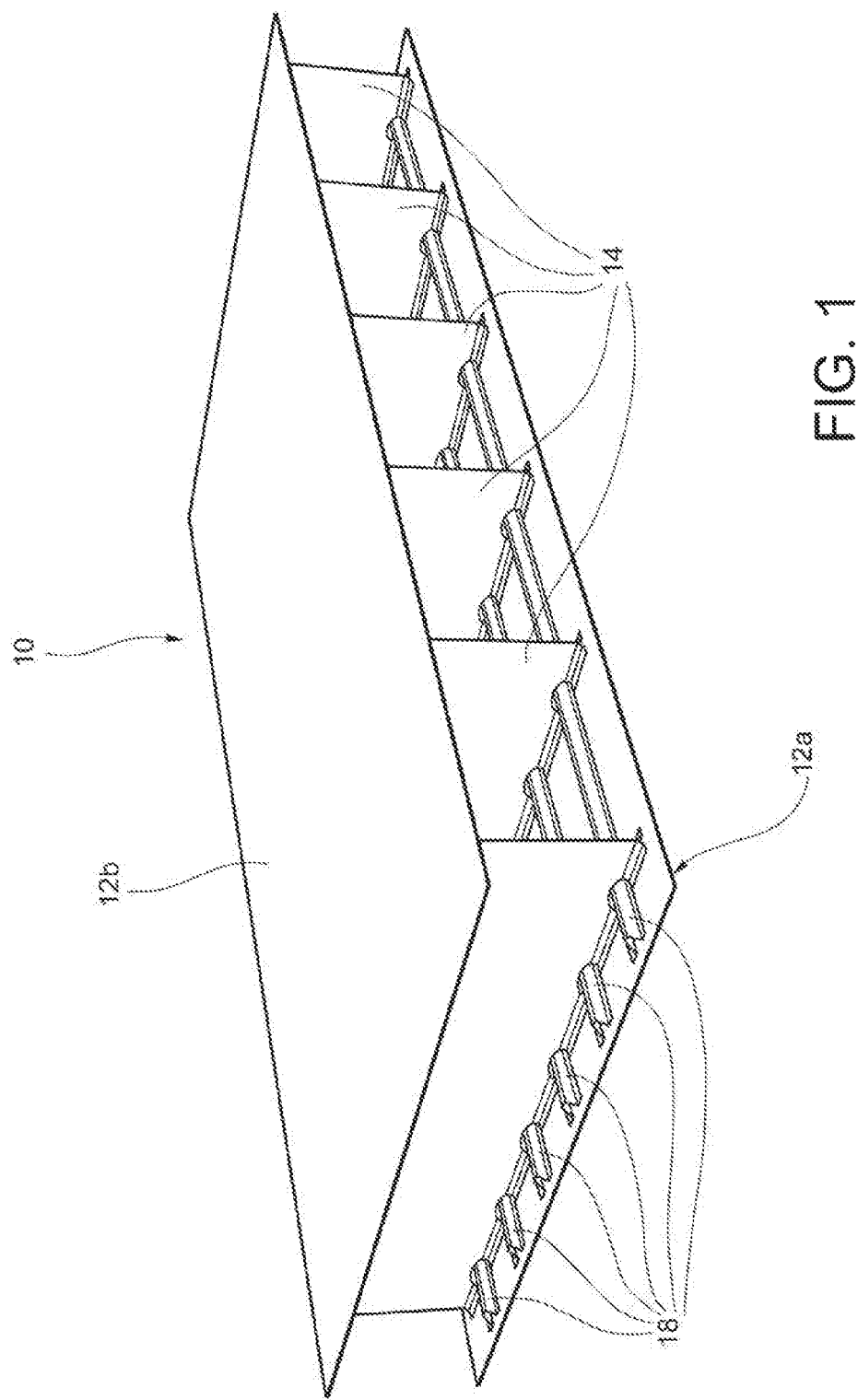
FIG. 1 is a perspective view of a wing box according to one possible embodiment of the invention.

In the present context, the term 'longitudinal' indicates a direction substantially coincident or parallel with that of the main extension of the wing or of the empennage, while the term 'transverse' indicates a direction substantially perpendicular thereto, identifiable, in general, with a direction substantially coincident or parallel with that of a wing or empennage profile.

With reference to the figures, an aircraft wing box as a whole is indicated with 10.

The wing box 10 comprises a first panel 12a, a second panel 12b, and a plurality of ribs 14.

The first panel 12a, the second panel 12b and the ribs 14 are made of composite material. Preferably, the composite material comprises a thermosetting or bismaleimide resin matrix and/or a carbon and/or glass fiber reinforcement.

The first panel 12a and the second panel 12b may be made in a similar way. In this example, for the sake of brevity, only the first panel 12a will be described, it being understood that the second panel 12b is generally made up of elements similar or identical to those of the first panel 12a, obtained by means of similar manufacturing processes.

The first panel 12a comprises a skin 16 and a plurality of reinforcement stringers 18.

The skin 16 comprises a sequence of plies of composite material, preferably of an epoxy resin matrix composite material with long carbon fiber reinforcement. The skin 16 may be obtained, for example, by means of lamination by hand or with automated systems according to the guidelines defined by the design of the component, or by means of any other known process for laminating layers of composite material. In the lamination of the skin 16, vacuum bag compaction with or without heat application may be carried out in a manner known per se.

The stringers 18 may have a closed cross-section of the omega type, trapezoidal type, or according to other geometries. Preferably, the stringers 18 have an omega-type cross-section. The stringers 18 may be obtained by any known procedure for processing composite materials. For example, the stringers 18 may initially be flat-laminated, similarly to the skin 16, and then cut with a clean profile along an edge thereof, and subjected to a forming process, in accordance with different operating methods according to the known art. For example, the stringers 18 may be formed on a male mold with membrane and vacuum application, or on a female mold with molding, with or without heat application, etc. Alternatively, the stringers 18 may be laminated directly onto a mold, one ply at a time.

The fresh, i.e., as of yet non-polymerized, stringers 18 may then be precisely positioned on the skin 16 by the use of auxiliary tools to support the stringers 18, and tilting systems coordinated with a lamination surface (not shown, but known per se) of the skin 16.

When the stringers 18 have been positioned on the skin 16, elongated stabilization inserts 17, preferably made of solid cross-section silicone rubber, may be positioned in the space defined between each stringer 18 and the skin 16. The elongated stabilization inserts 17 placed in this space act as a support, whereon, during the process of polymerization in autoclave, the plies of composite material of each stringer 18 are consolidated, acquiring the final design shape. The advantage of the elongated stabilization inserts 17 is that they are flexible enough to adapt to any ramps and steps that may be envisaged on the skin 16 underneath the stringers 18. The elongated stabilization inserts 17 are able to tolerate the high temperature and pressure levels expected in the autoclave for the curing process (generally, about 180° C. and 6 bar), without deformation and degradation, avoiding geometric defects to the stringers 18. Advantageously, the elongated stabilization inserts 17 are made with a silicone rubber compound that ensures the absence of contamination of the matrix of the composite material of the first or second panel 12a or 12b, and their thermal expansion must be controlled to ensure compliance with the geometric requirements and the proper compaction of each stringer 18 after the curing process. Preferably, the elongated stabilization inserts 17 are made of a rubber of the group of basic VMQ elastomers (i.e., vinyl-methyl-polysiloxane, group Q, according to the ISO 1629 standard) having, for example, a hardness of about 70 shore A, a density of about 1.2 g/cm3, and a thermal expansion coefficient of about 250 µm/m° C. Other known methods for obtaining stringers 18 made of composite material according to the invention comprise, for example, the use of inflatable tubular bags.

On an outer surface of each stringer 18 is typically placed a caul plate (not shown, known per se), made of carbon fiber or metal, sufficiently flexible, for example consisting of two consecutive layers of composite material, or aluminum layers of 0.5-1 mm. Said caul plate ensures that the shape of the stringers 18 is maintained during the curing process.

By virtue of these and other known processes for manufacturing components from composite laminate materials, it is thus possible to obtain a first panel 12a and a second panel 12b that are fresh, i.e. non-polymerized or uncured, each comprising the skin 16, and the plurality of reinforcement stringers 18, arranged on a first side 16' of the skin 16. These stringers 18 extend along a longitudinal direction x, i.e., parallel to a main direction of extension of the wing or the empennage. The first and second panels 12a and 12b thus obtained are, as known to the person skilled in the art, substantially curved according to the technical specifications of the wing or empennage to be obtained.

The plurality of ribs 14 may comprise ribs 14 that are identical or similar in shape and proportions. More likely, each rib 14 is different, depending on the variability of the thickness of the wing or empennage to be obtained, and the specific geometric characteristics of the lower or upper surfaces of the airfoil, and the typical tapering of the wing box 10 along the longitudinal direction, in a manner known per se.

The ribs 14 may, for example, have a double T shape obtained by placing two C-shaped elements side by side, preferably with the addition of fillers made of unidirectional preformed pre-preg material (called 'noodles', not shown and known per se) in cavities created at the coupling of the two C-shaped elements. For example, each C-shaped element may be flat-laminated, and then cut with a clean profile along one of the edges thereof, to then undergo a forming process in accordance with various operating modes according to the known art. Alternatively, each C-shaped element may also be laminated directly onto a male mold, one ply at a time, after the numerically-controlled cutting of each of them. The cutting, carried out flat, with a clean profile of each C-shaped element, must also take into due consideration the presence of openings 14', envisaged at the points of intersection with the stringers 18 of the first panel 12a and/or the second panel 12b.

Each rib 14 is made of composite material, and comprises a central plate 15, a first pair of flanges 15a and a second pair of flanges 15b. The first pair of flanges 15a and the second pair of flanges 15b are arranged at opposite ends of the plate 15, so as to obtain a conventional double-T cross-section.

Figure 3:
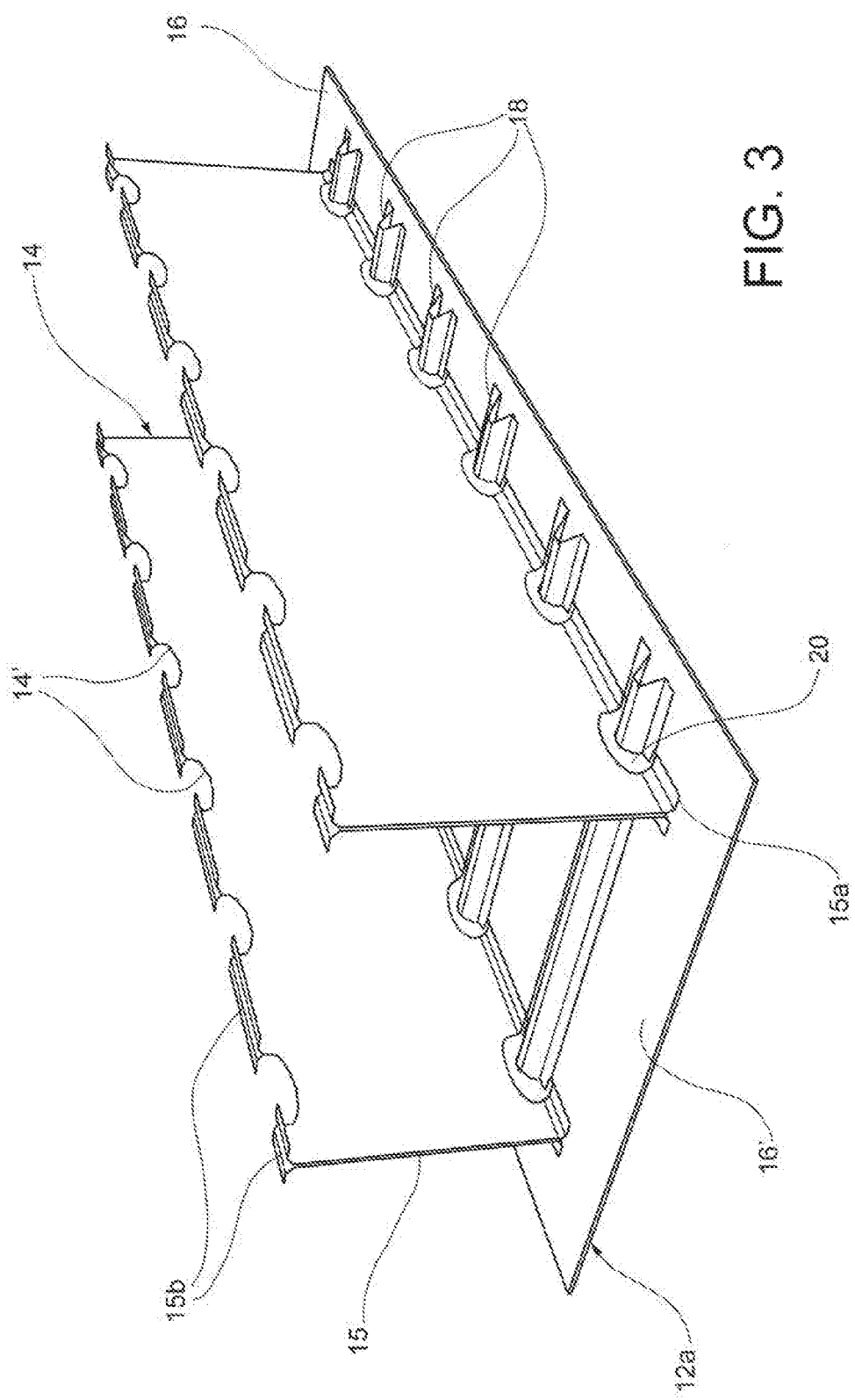
FIG. 3 is a perspective view of a first panel and a pair of ribs.
Figure 4:
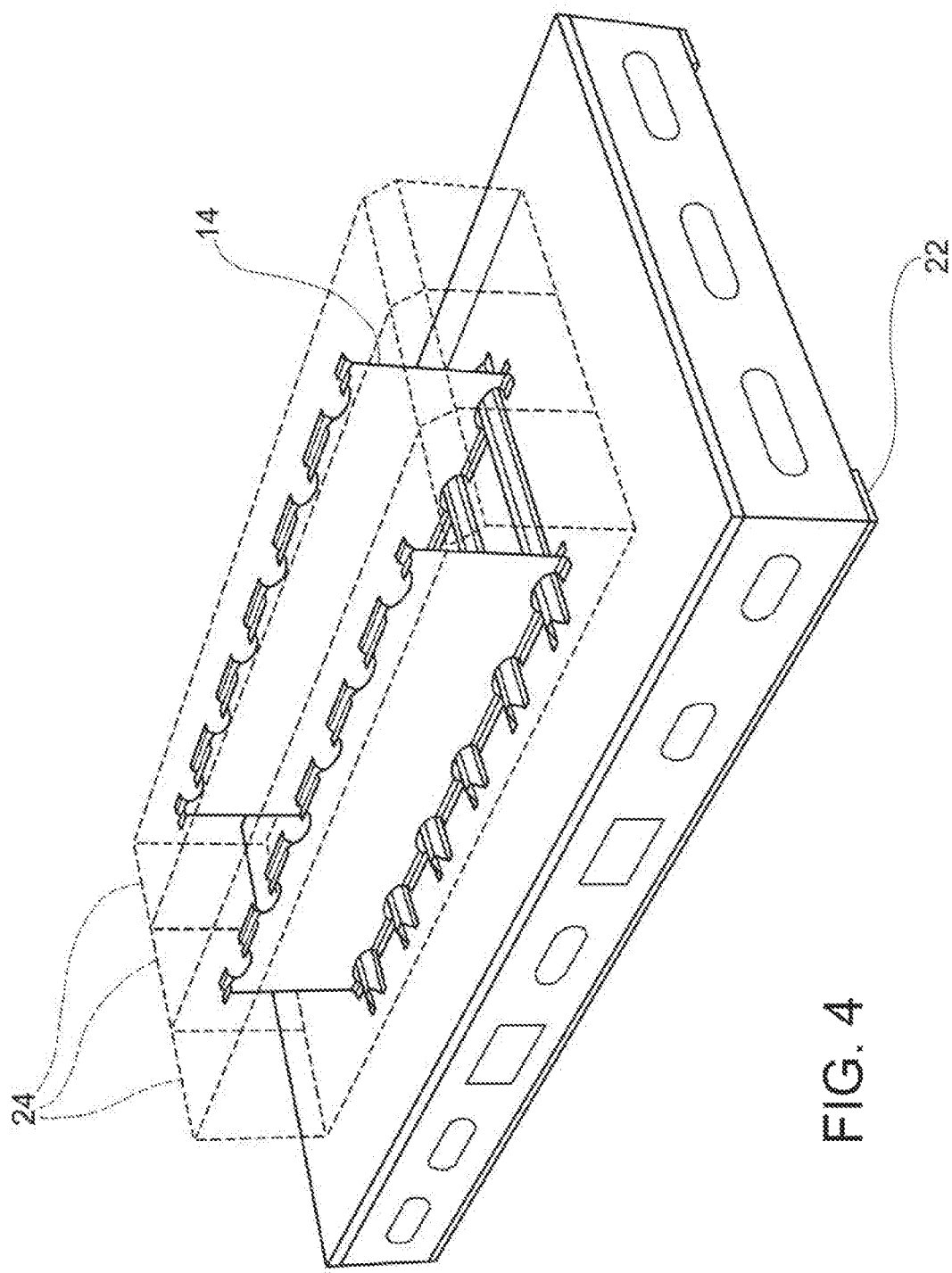
FIG. 4 is a perspective view of a first panel, a pair of ribs and a tool.
Figure 5:
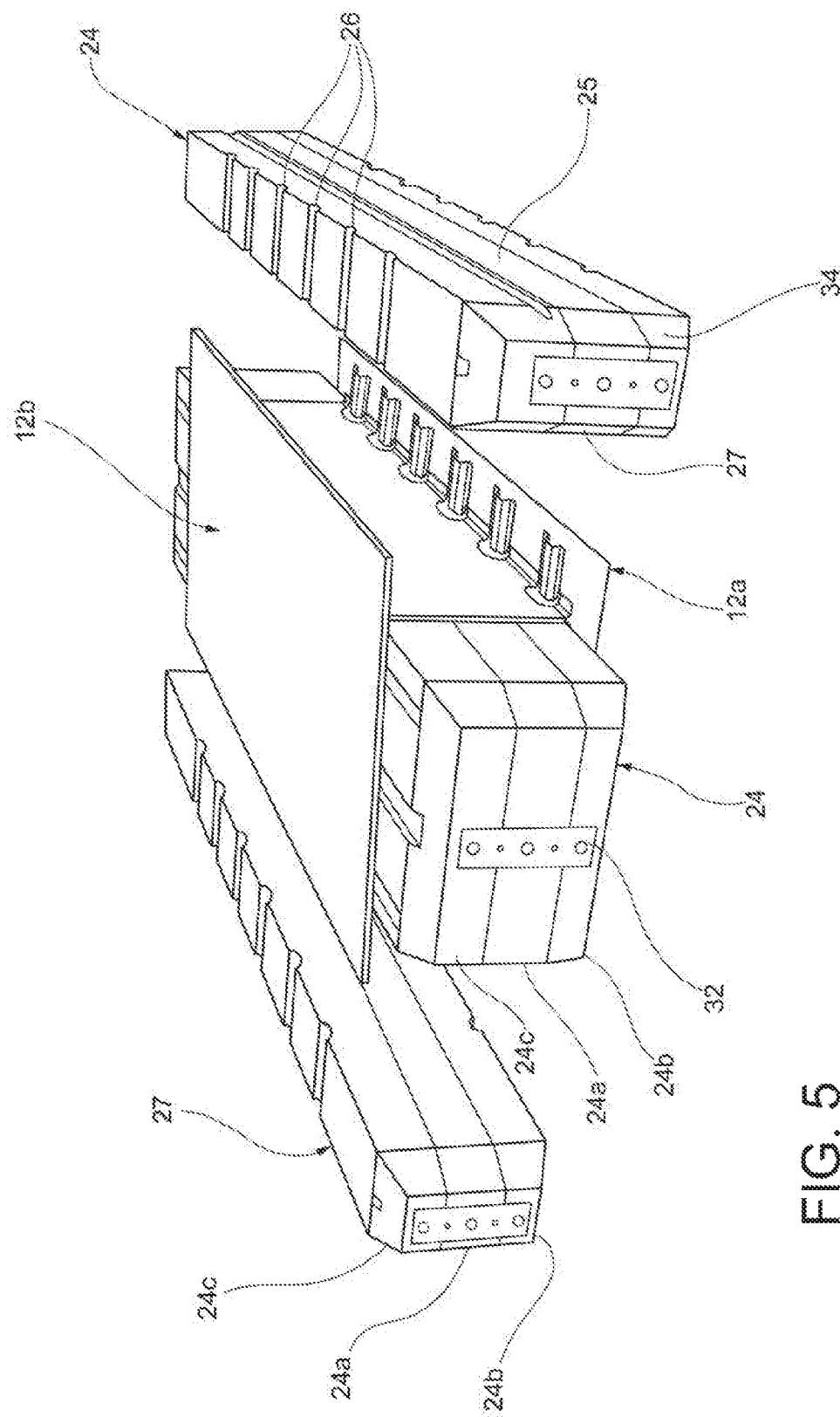
FIG. 5 is a perspective view of a first and a second panel and a pair of ribs and a tool.
Figure 6:
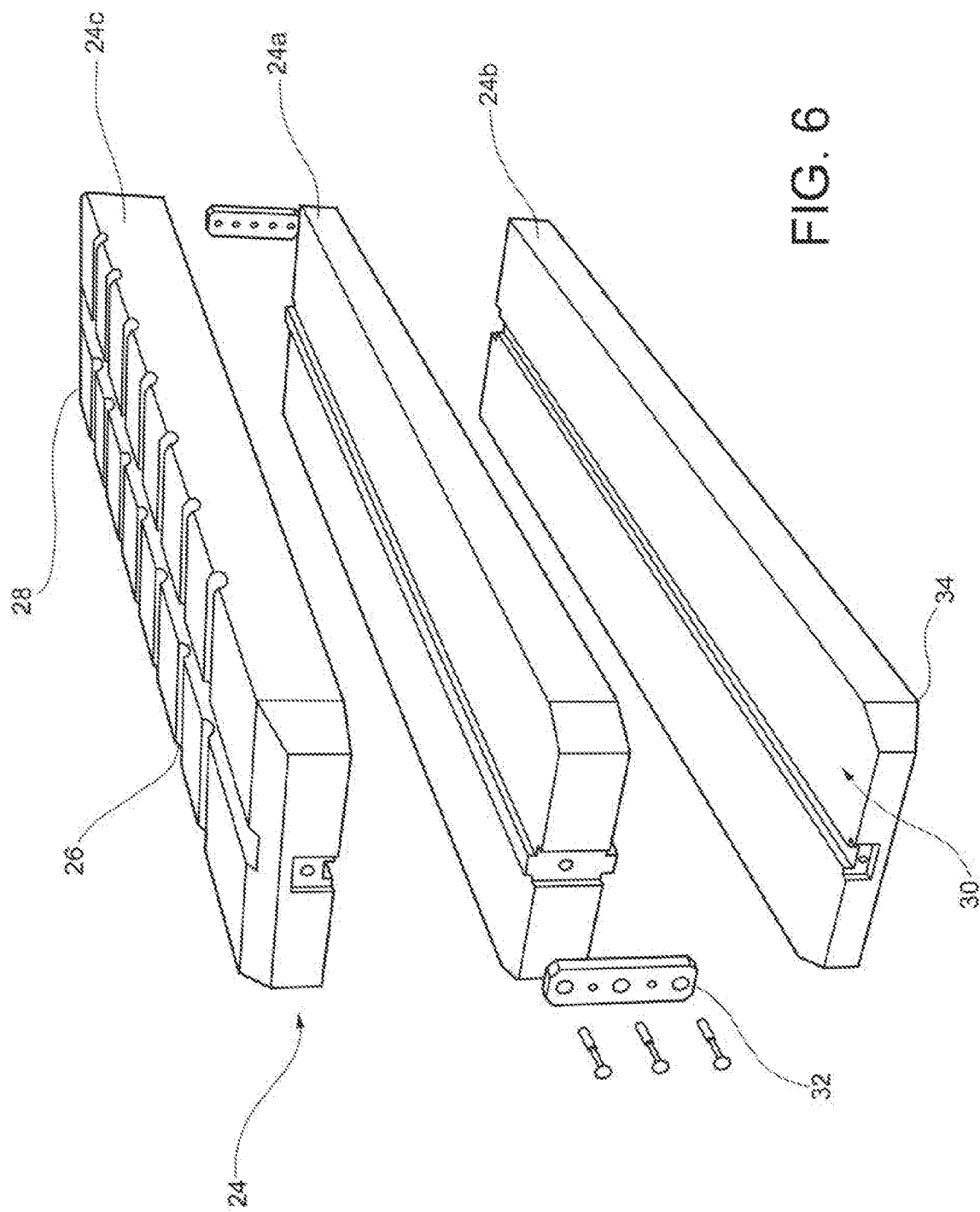
FIG. 6 is an exploded view of a tool.

It is also possible to make the ribs 14 by providing the possibility of using support inserts 20, to be positioned in the aforesaid openings 14', in contact with the rib 14, as shown in FIG. 3. These support inserts 20 have, preferably, the same thickness as the rib 14 and a shape that fills the space between the clean cut of the openings 14' and the stringer 18 of the first or second panel 12a or 12b whereon they rest. Preferably, the support inserts 20 are made of plastic material resistant to the temperatures and pressures typical of the curing process, and are free of sharp edges in order to avoid damage to the film of the curing bag with which it will come into contact.

By virtue of these and other known processes for manufacturing components from composite laminate materials, it is thus possible to obtain a plurality of fresh, i.e. non-polymerized, ribs 14, each having, preferably, a double T-shaped cross-section and a plurality of openings 14', envisaged at the points of intersection with the stringers 18 of the first panel 12a and/or the second panel 12b.

A manufacturing process will now be described of a multi-ribbed wing box 10 made of composite material from a first and second panel 12a and 12b, and from a plurality of ribs 14, as just described.

Figure 2:
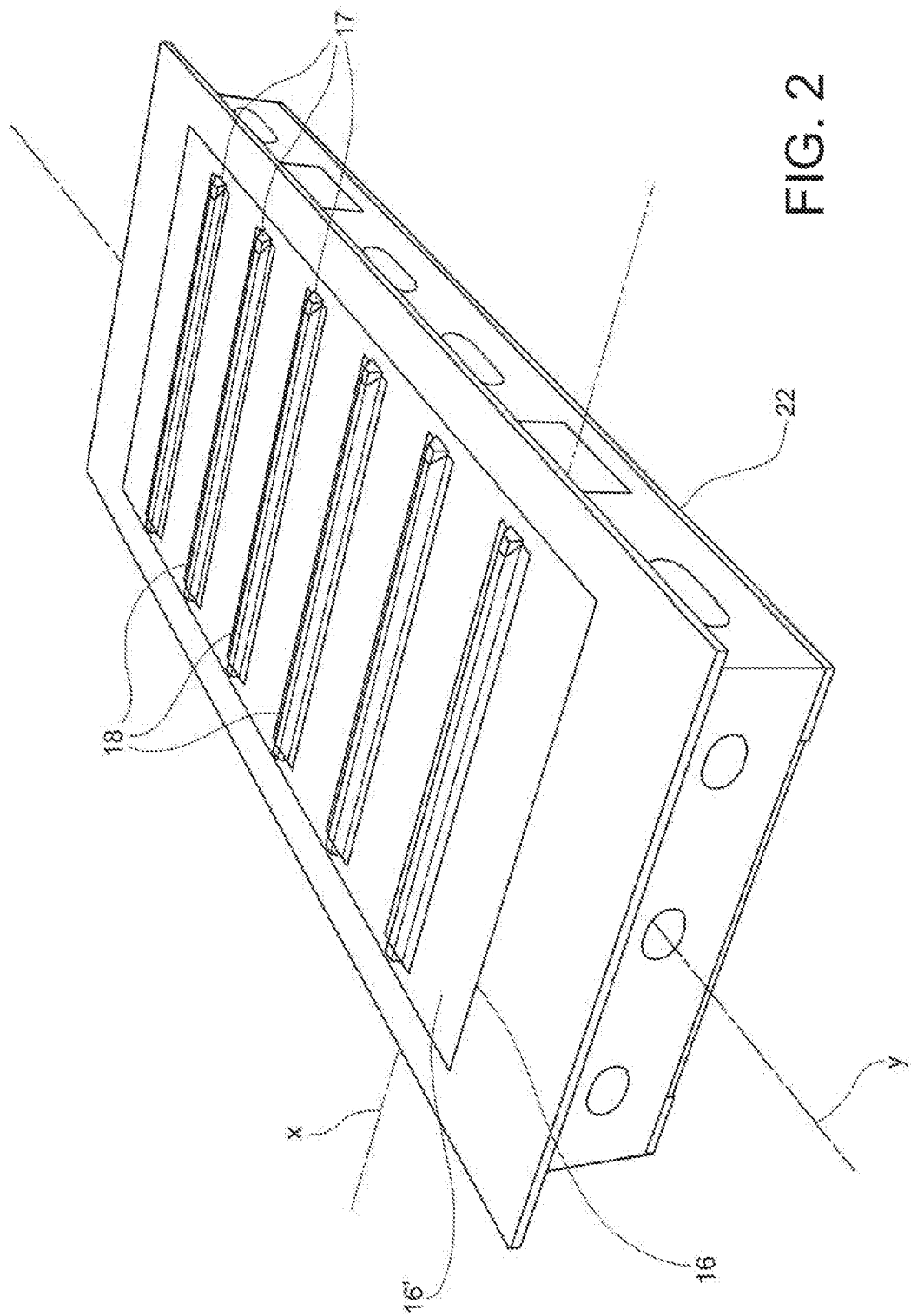
FIG. 2 is a perspective view of a first panel arranged on a curing surface.

Initially, as shown in FIG. 2, the first panel 12a made of composite material, comprising the skin 16 and a plurality of stringers 18, is arranged on a suitable curing surface 22.

Then, as shown in FIG. 3, the plurality of ribs 14, in this example two ribs 14, made of non-polymerized composite material, are placed on the first side 16' of the skin 16 of the first panel 12a. In particular, the first rib 14 is initially arranged along a transverse direction y, i.e. in a manner substantially perpendicular to the stringers 18. In particular, the first rib 14 is arranged by placing its respective first flange pair 15a in contact with the first side 16' of the skin 16 of the first panel 12a, so that the openings 14' are positioned in correspondence with the stringers 18, which will each extend through a respective opening 14'.

At this point, a tool 24 is placed on said first side 16' of the skin 16 of the first panel 12a, in contact with the first rib 14.

The tool 24 has the function of supporting the bag materials to be used in the curing process, which are arranged to totally wrap each tool 24, and which, being flexible (being, in effect, films and plastic fabrics) could not otherwise be located within the bays—i.e. the spaces defined between two consecutive ribs 14—for the total and complete coverage of the composite surfaces to be polymerized. Moreover, the tool 24 also has the function of distancing and holding the ribs 14 in the theoretical positions provided by design and allows the transfer of the plurality of ribs 14 (preformed and non-polymerized) onto the first panel 12a.

For the specific configuration of the example of a wing box 10 shown in the figures, the tool 24 has, preferably, dimensions suitably smaller than the theoretical inner surfaces of the bays, in order to guarantee sufficient space for the thickness of the bag materials to cover the tool.

Advantageously, the tool 24 is provided with grooves 26, shaped to accommodate the stringers 18 and the caul plates thereof. In particular, a tool provided with grooves 26 both on its top surface 28 and on its bottom surface 30, opposite to its top surface 28, is suitable to accommodate in said grooves 26 both stringers 18 of the first panel 12a and stringers 18 of the second panel 12b.

Preferably, the tool 24 is made of low-mass density material, in particular, for example, a material having a mass density of less than 1.7 g/cm3, and in a configuration with high bending stiffness, in particular, for example, able to contain the bending strain within one millimeter per meter of length, this being in order to allow easy handling, even manually, of the tool 24, and to avoid any deformations that could be transferred to the ribs 14 in the fresh state during their positioning on the first panel 12a. To avoid damaging the materials of the bag due to impacts and/or tears with the tools 24, the tools 24 are, preferably, made of resin or by using plastic materials, with or without reinforcements.

In addition, the tool 24 is preferably capable of withstanding a positive pressure of at least 1 bar without collapsing, yielding or deforming, as during the dressing thereof with the bag materials the application of a vacuum may be envisaged.

The tool 24 is made of several modular parts, in particular at least three modular parts, to allow the extraction thereof from each bay after the closure with the second panel 12b, this being despite the undercuts offered by the configuration of the wing box 10, resulting both from the presence of stringers 18 on the skin 16 of the first panel 12a and on the skin 16 of the second panel 12b, and from any curved profile that the first and the second panel 12a and 12b may have.

For these reasons, the tool 24 comprises a central part 24a, a bottom part 24b and a top part 24c, wherein the central part 24a is interposed between said bottom part 24b and said top part 24c, and is extractable along the transverse direction y.

Preferably, at least two among the central part 24a, the bottom part 24b and the top part 24c are bound together by a removable constraint element 32. The constraint element 32 may comprise, for example, a plate which extends partially onto each of the parts of the tool 24, and which is bound to each part by conventional mechanical fastening elements, such as screws or bolts.

The central part 24a of the tool 24 has, advantageously, a tapered section along the transverse direction y. In any case, the central part 24a of the tool has a section such that it may be pull out along the transverse direction y, for example a section that decreases linearly from one end of the central part 24a to the other along the transverse direction y.

Advantageously, at least one among the central part 24a, the bottom part 24b and the top part 24c of the tool 24 has chamfers 34 adapted to improve the handling thereof.

Once a tool 24 has been placed in contact with the first rib 14, a second rib 14 is placed, in the same way as the first rib 14, on said skin 16 of the first panel 12a, along the transverse direction y, in contact with the tool 24, on the side opposite to the first rib 14.

Alternatively, the plurality of ribs 14 and tools 24 may be loaded simultaneously on the side 16' of the skin 16. According to this embodiment, it is possible to arrange a first tool 24, placing it on its first lateral surface 25—thus substantially rotating it by 90°—so as to have upwards a second lateral surface 27 thereof, opposite to the first lateral surface 25. Then, one proceeds to position a rib 14 on said first tool 24, placing the respective plate 15 on said second lateral surface 27. One thus proceeds by alternating the arrangement of a tool 24 and a rib 14 so as to obtain an assembly comprising an alternating succession of tools 24 and ribs 14 that begins and ends with a pair of outer tools 24. The assembly is then rotated appropriately and subsequently positioned on the skin 16 of the first panel 12a, so that each first pair of flanges 15a rests on said first side 16' of the first panel 12a. This operation may be coordinated with precision by means of suitable metallic systems of engagement arranged both on the curing surface 22 and at the ends of the tools 24.

In essence, a rib 14 and a tool 24 are arranged alternately so that each pair of consecutive ribs 14 is in contact with a same tool 24.

Before being placed inside a respective bay, i.e., in contact between a pair of consecutive ribs 14, each tool 24 may, preferably, be dressed with the bag materials necessary for the curing process in autoclave.

In particular, it is possible to dress them with the bag materials typical of the vacuum bag curing process in autoclave, such as, for example, high-temperature nylon film, surface ventilation nylon or polyester fabric, high-temperature separator film. These may be arranged manually on each tool 24 in sequence, one on top of the other, forming, by using tapes and sealant, a tubular extension that completely wraps each tool 24, like a candy. Alternatively, the necessary bag materials may already be made in a tubular format, and fitted like a stocking on each tool 24. After dressing, the vacuum may be applied to the outermost ply of the curing bag to ensure that the bag materials are adapted to the surfaces of each tool 24, avoiding wrinkling and bridging of the same materials.

Once all the necessary ribs 14 and tools 24 have been arranged, between each pair of consecutive ribs 14 there being thus arranged a respective tool 24 in contact with both ribs 14, the second panel 12b is arranged. The second panel 12b is placed in contact with each second pair of flanges 15b of each respective rib 14, covering each bay, i.e., the spaces between each pair of consecutive ribs 14.

The correct positioning of the second panel 12b may be ensured, for example, by mechanical coordination systems, such as existing male/female cones, or by other suitable known precision handling systems.

In one embodiment, it is possible to use a first panel 12a made of already polymerized composite material, and, thus, to arrange a respective ply of high-temperature structural adhesive between each first pair of flanges 15a of each rib 14 and said first side 16' of the first panel 12a. Similarly, it is also possible to use a second panel 12b made of already polymerized composite material, and thus to arrange a respective ply of high-temperature structural adhesive between each second pair of flanges 15b of each rib 14 and said first side 16' of the second panel 12b. When a first or second panel 12a or 12b of already polymerized composite material is used, the curing process is called co-bonding and the ply of structural adhesive guarantees adhesion between the ribs 14 and the first or second panel 12a or 12b, respectively.

In a further embodiment, it is possible to interpose, between the second panel 12b and the second pair of flanges 15b of each rib 14, a respective high-temperature release ply (such as, for example, FEP or PTFE) in order to make, after the curing process, the second panel 12b removable from the rest of the wing box 10, this being in order to ensure accessibility to the interior thereof for any installation of systems or structural components. The second panel 12b may subsequently be mounted on the ribs 14 with traditional methods, taking advantage of the fact that, following the curing process, the profile of the second pair of flanges 15b has been molded on the second panel 12b (except for the release film, which is generally very thin, for example, having a thickness of about 0.1 mm), facilitating the perfect coupling of the parts.

Advantageously, it is possible to arrange a pair of tools 24 externally on said first side 16' of the skin 16 of the first panel 12a, respectively in contact with a first and a last rib 14.

The process is completed by sealing the respective ends of the curing bags of each tool 24 together and on the respective surfaces of the curing surface 22 and a respective top curing tool arranged on the second panel 12b, and with two additional strips of bag materials placed outside the wing box 10 on the outer tools 24.

After applying the full vacuum to the curing bags and carrying out the necessary leak tests, each tool 24 is pull out from the bays and the external tools 24 are removed. According to the invention, the extraction of the tools 24 from the bays is made possible due to the particular configuration of each tool 24. Specifically, it is possible, first of all, to proceed with the extraction of the central part 24a, keeping, preferably, the top part 24c constrained, in order to avoid its fall by gravity. Then, the top part 24c may be removed, and finally the bottom part 24b.

It is possible to extract or remove the central part 24a of each tool 24 solely by a pulling action in the transverse direction y. Then, the top part 24c and the bottom part 24b of each tool 24 are first moved in a vertical direction to bypass the undercuts inside the bays, and then pulled along the transverse direction y.

When present, it is necessary to remove the constraint element 32 before proceeding with the extraction of the central part 24a of each tool 24, so as to be able to release the central part 24a, the bottom part 24b and the top part 24c from each other.

It is also possible to remove the tools 24 after the curing process in autoclave. In other words, it is possible to have the first panel, the second panel, and each rib undergo a curing process in autoclave with vacuum bag, according to a specific pressure and temperature cycle, for curing the non-polymerized components before pulling out the central part of each tool along the transverse direction and subsequently removing the top part and the bottom part of each tool.

Finally, the assembly comprising the first panel 12a, the second panel 12b and each rib 14 is subjected to a curing process. The curing process is known per se and involves the application of a specific temperature and pressure cycle, and will not be described further.

After the curing process, it is possible to proceed with breaking up, i.e., removal of the curing bags, and then with lifting the top curing tool, and, finally, with removal of the caul plate and of the elongated stabilization inserts 17 placed between the stringers 18 and the skin 16, as well as any support inserts 20 in the openings 14' of each rib 14.

Figure 7:
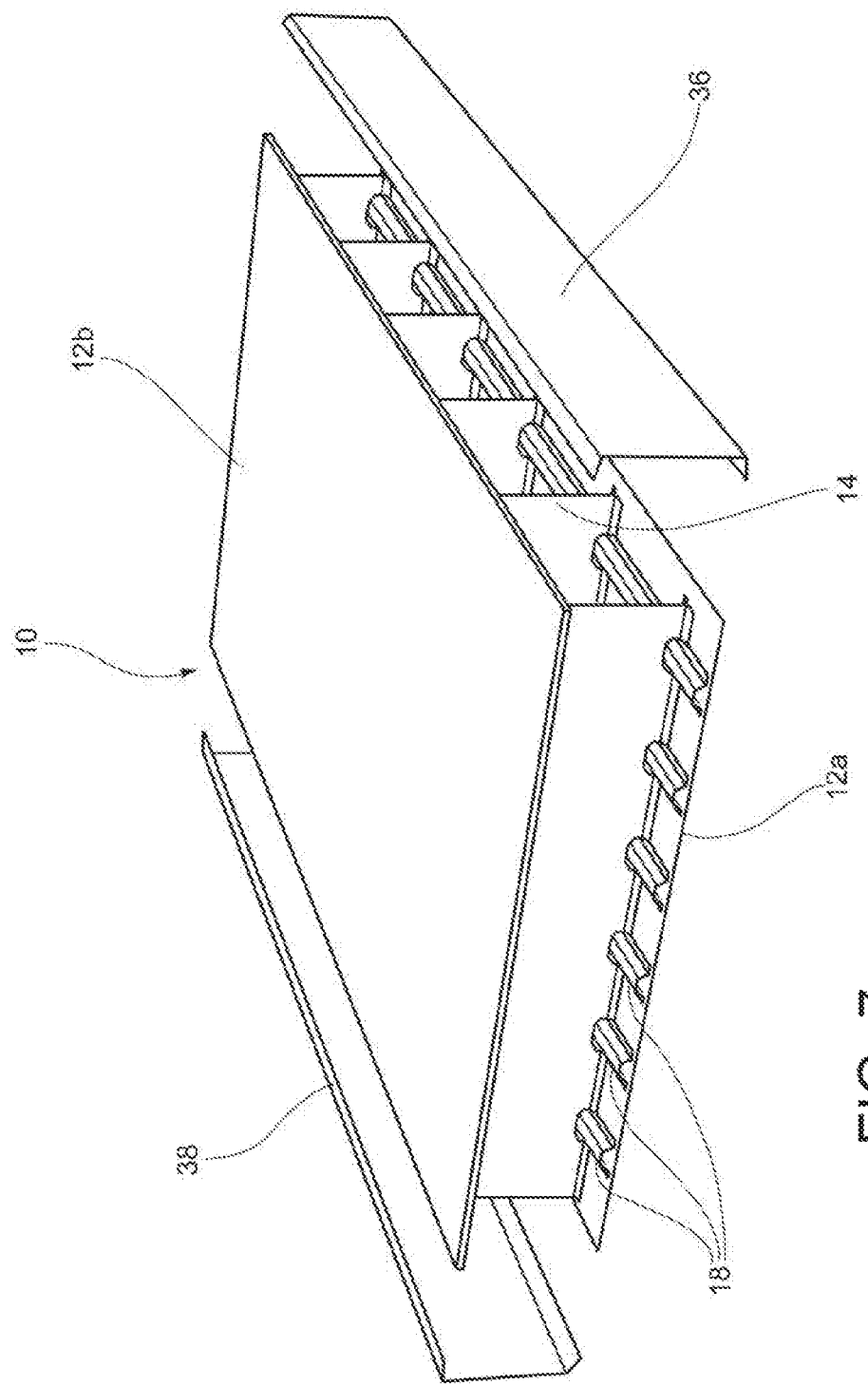
FIG. 7 is an exploded view of a wing box complete with its front and rear spars.

At this point, the monolithic component thus obtained may be fitted with a corresponding front spar 36 and a corresponding rear spar 38 (shown in FIG. 7, known per se), manufactured separately as loose components, by means of a traditional assembly, to complement the wing box 10.

As may be seen from the description provided above, various advantages may be obtained through a manufacturing method according to the invention.

By virtue of such a method, it is possible to reduce, compared to the so-called 'build-up' configuration: production costs, by virtue of the lower number of parts to be manufactured and managed in the production system; the number of holes and the relative fastening members to be installed, thus reducing assembly and procurement times and costs for drill bits and fastening members, which are typically very onerous; the number of inspections to be carried out during assembly for testing the fastening members and for verifying the absence of any play between the coupling parts; and the weight of the structure, due to the reduced number of fastening members required and the elimination of local thickening in the drilling areas necessary to safely withstand the design loads.

Moreover, with respect to the known art for the construction of wing boxes by co-curing of composite materials, it is possible to manufacture, through the method according to the invention, a less simplified configuration and applicable not only to horizontal stabilizers, but also to structures that require a high resistance to torsion, such as wing and tail unit boxes, while being economically competitive.

Without altering the principle of the invention, the embodiments and the details of implementation may vary widely with respect to those described and illustrated purely by way of non-limiting example, without thereby departing from the scope of the invention as described and claimed herein.

What is claimed is:

1. A method for manufacturing a wing box for aircraft, comprising the steps of:
    a1) arranging, on a curing surface, a first panel, in a composite material, comprising a skin having a first side and a plurality of stringers that extend parallel to a longitudinal direction;
    a2) providing a plurality of ribs, in non-polymerized composite material, each rib comprising a plate, a first pair of flanges and a second pair of flanges, each pair of flanges being arranged at opposite ends of said plate;
    a3) providing at least one tool, each tool having a first lateral surface and a second lateral surface, opposite to the first lateral surface, and comprising a central part, a bottom part and a top part, wherein the central part of each tool is interposed between said bottom part and said top part of each tool and may be pulled out in a transverse direction;
    b) alternately arranging a rib on said first side of the first panel along the transverse direction, by placing the first pair of flanges on said first side of the first panel, and a tool, between each pair of consecutive ribs and in contact with both of them;
    c) arranging a second panel, in a composite material, comprising a skin, having a first side, and a plurality of stringers that extend along a longitudinal direction, by putting said second panel in contact with the second pair of flanges of each rib;
    d) pulling out the central part of each tool along the transverse direction and subsequently removing the top part and the bottom part of each tool; and
    e) having the first panel, the second panel, and each rib undergo a curing process in autoclave with vacuum bag, according to a specific pressure and temperature cycle, for curing the non-polymerized components.

2. The method of claim 1, further comprising the step of:
    f) providing, before step c) a further pair of tools, externally, on said first side of the first panel, each respectively in contact with a first and a last rib.

3. The method of claim 1, further comprising, before step b), the steps of:
    g1) arranging a first tool, placed on its first lateral surface;
    g2) arranging, alternately, a rib, by placing the respective plate on said second lateral surface of the tool, and a tool, between each pair of consecutive ribs and in contact with both of them; and
    g3) rotating the assembly of ribs and tools for arranging the assembly on said first side of the first panel so that each first pair of flanges rests on said first side of the first panel.

4. The method of claim 1, wherein the first panel is made of a polymerized composite material, the method further comprising the step of:
    f1) arranging, before step b), a respective ply of high-temperature structural adhesive between each first pair of flanges of each rib and said first side of the first panel.

5. The method of claim 1, wherein the second panel is made of an already polymerized composite material, the method further comprising the step of:
    f2) arranging, before step c), a respective ply of high-temperature structural adhesive between each second pair of flanges of each rib and said first side of the second panel.

6. The method of claim 1, further comprising the step of:
    f3) arranging, before step c), a respective high-temperature release ply between each second pair of flanges of each rib and said first side of the second panel.

7. The method of claim 1, wherein the plurality of stringers of the first panel and/or of the second panel is made of a non-polymerized composite material, the method further comprising the steps of:
    h1) arranging, before step a1), solid cross-section elongated stabilization inserts in a space defined between each stringer and the respective first panel or second panel; and
    h2) removing, after step e), said elongated stabilization inserts.

8. The method of claim 7, wherein said elongated stabilization inserts are made of a rubber of the group of basic VMQ elastomers (i.e., vinyl-methyl-polysiloxane, group Q, according to the ISO 1629 standard).

9. The method of claim 1, wherein the composite material of at least one among the first panel, the second panel and the plurality of ribs comprises a thermoset or bismaleimide resin matrix and/or a carbon and/or glass fiber reinforcement.

10. The method of claim 1, further comprising the step of:
    m) covering each tool, before step b), with a curing bag.

11. The method of claim 1, wherein each rib has openings arranged in correspondence with respective reinforcement stringers of the first panel and/or of the second panel.

12. The method of claim 11, comprising the step of:
    n) providing support inserts, made of a plastic material to withstand the specific pressure and temperature cycle of the curing process in autoclave, in each opening of each rib, in contact with the respective reinforcement stringers.

13. The method of claim 1, further comprising the step of:
p) before step d), removing from each tool a removable constraint element adapted to secure to each other at least two among the bottom part, the central part and the top part of each tool.

14. The method of claim 1, wherein the central part of each tool has a tapered section along the transverse direction.

15. The method of claim 1, wherein each tool is made of a material having mass density lower than 1.7 g/cm3, and in a configuration having a bending stiffness such that the bending strain is limited within 1 mm for each meter of length.

16. The method of claim 1, wherein at least one among the central part, the top part and the bottom part of each tool has chamfers adapted to facilitate handling.

* * * * *